Feb. 22, 1927.
G. C. JETT
1,618,203
CREEPER TRACTOR MECHANISM
Filed Sept. 27, 1922    3 Sheets-Sheet 1
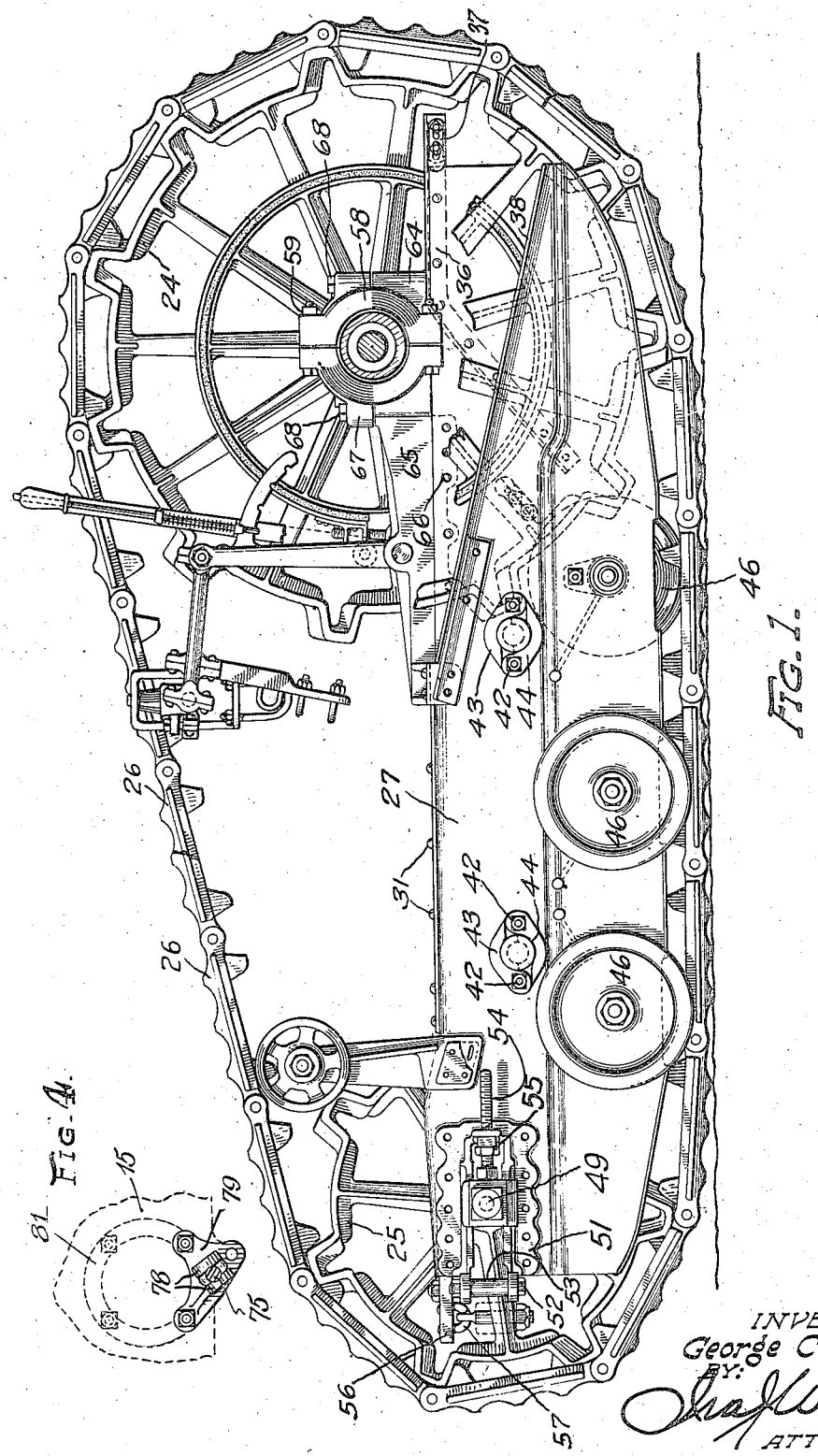
INVENTOR:
George C. Jett.
BY:
Ira J Wilson
ATTORNEY.

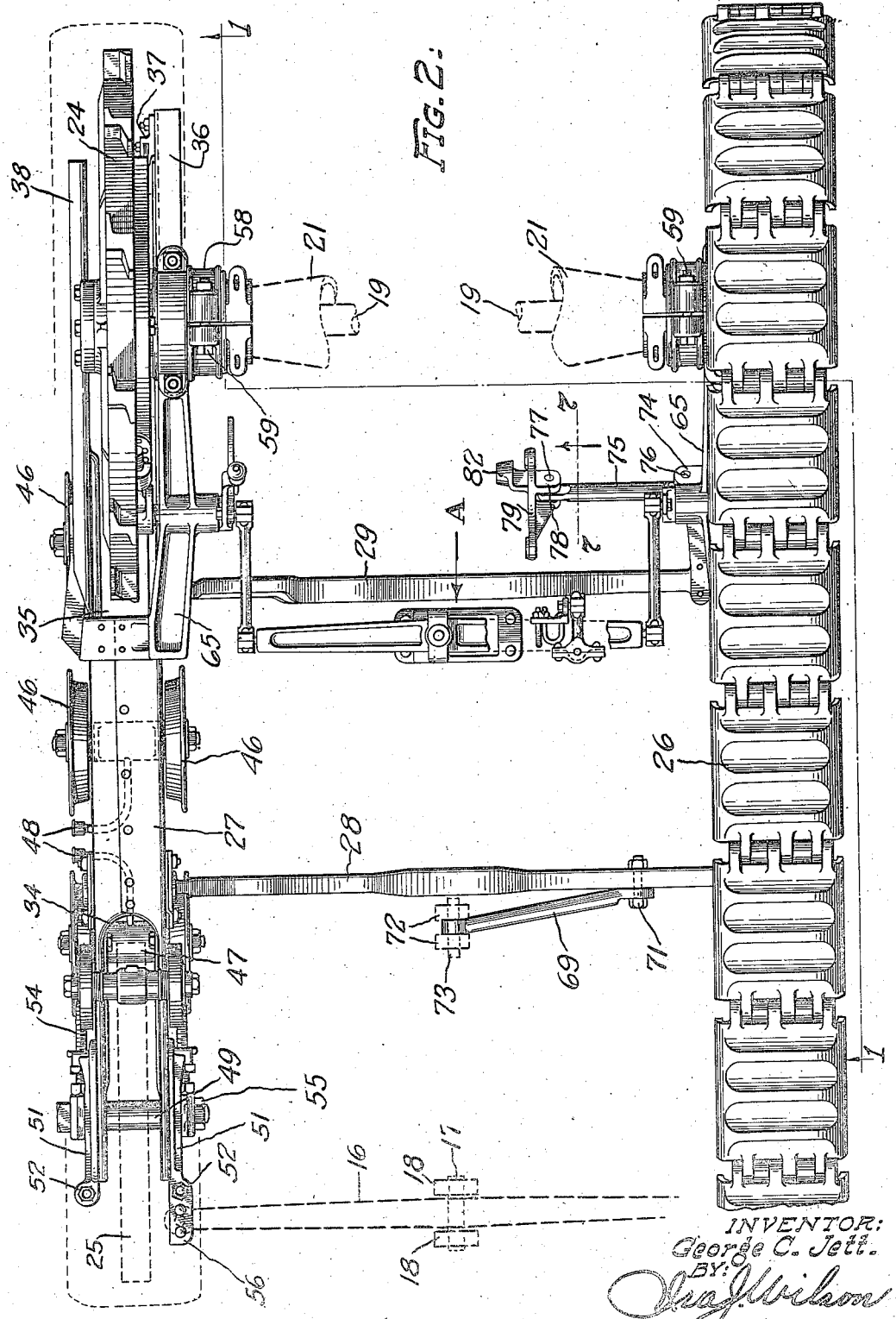

Feb. 22, 1927. 1,618,203
G. C. JETT
CREEPER TRACTOR MECHANISM
Filed Sept. 27, 1922   3 Sheets-Sheet 3
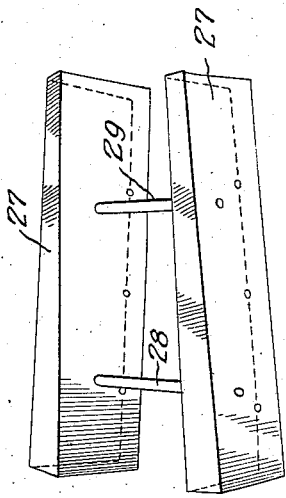
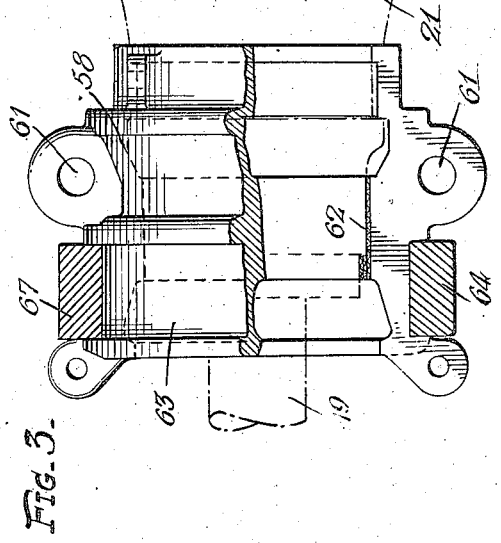
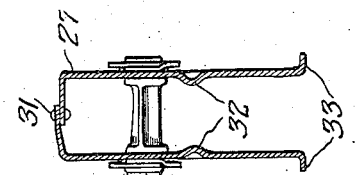
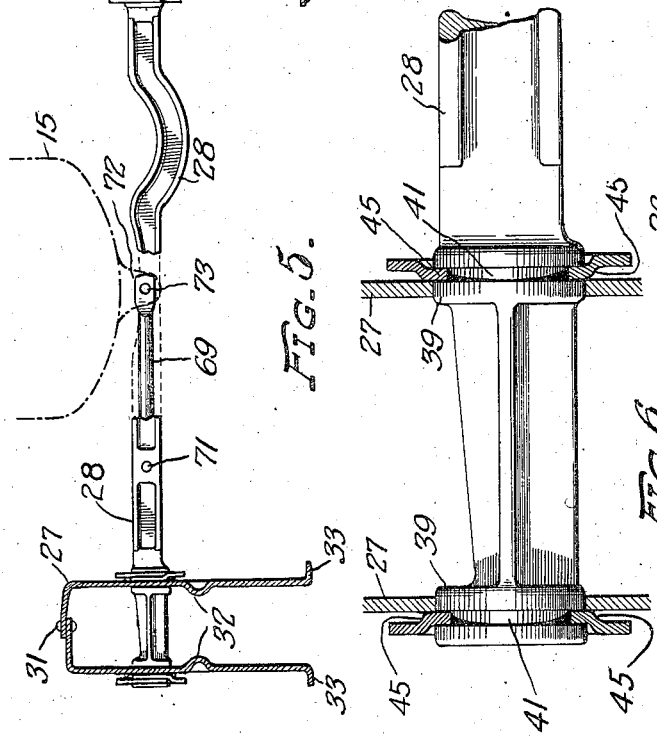
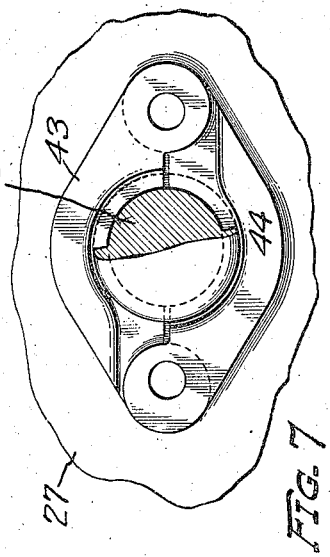
INVENTOR:
George C. Jett.
BY
Ira J. Wilson
ATTORNEY.

Patented Feb. 22, 1927.

1,618,203

UNITED STATES PATENT OFFICE.

GEORGE C. JETT, OF MILWAUKEE, WISCONSIN, ASSIGNOR OF TWO-FIFTHS TO WALTER H. STIEMKE, OF MILWAUKEE, WISCONSIN.

CREEPER TRACTOR MECHANISM.

Application filed September 27, 1922. Serial No. 590,848.

My present invention relates generally to the endless chain tread type of tractors and has reference more particularly to novel improvements in the tractor truck framework, the supporting connections between the truck and the tractor body, and to the steering control mechanism.

One of the primary objects of this invention is to provide an apparatus or mechanism set in the form of an accessory or attachment which is capable of being substituted in place of certain removable parts of a standard round wheel or wheel tread tractor, to thereby convert such round wheel tractor into a chain tread full creeper tractor possessing the advantages of power economy, freedom from soil packing and all other desirable features inherent in full creeper tractors over the round wheel type.

Another advantageous feature of my invention resides in the truck mechanism structure which comprises a pair of truck side frame members flexibly connected together so as to permit of vertical movements of the members relatively to each other, while at the same time maintaining the members in predetermined spaced relation. Furthermore, the members themselves are inherently flexible and flexibly connected to the tractor body with the result that a high degree of flexibility in the structure as a whole is secured, which facilitates its easy and rapid progress over uneven ground without subjecting the body to excessive torsions, stresses or strains and at the same time requisite strength and rigidity of structure to ensure satisfactory operation and longevity of the machine are maintained.

A further object is to provide a full creeper tractor truck structure which is in itself a complete assembled unit adapted to be easily, quickly and conveniently attached to the power plant and transmission, or in other words, the tractor body, of several present existing designs of round wheel tractors now marketed and used in the trade.

A further feature resides in the fact that all of the connections between the truck mechanism structure and the tractor body are made to the body at desirable points not only from the standpoint of convenience of attachment, but also for purposes of strength and durability, and in addition the connections are so constructed as to contribute toward the flexibility of the machine as a whole.

Other objects and many inherent advantages of this invention will be apparent as the invention becomes better understood by reference to the following description when considered in connection with the accompanying drawings illustrating the principles of the invention in one of its preferred embodiments.

Referring to the drawings:

Fig. 1 is a side elevation of a creeper mechanism embodying my invention, certain portions being broken away substantially on the line 1—1 of Fig. 2 to more clearly disclose certain parts otherwise concealed from view.

Fig. 2 is a plan view of the creeper truck mechanism, one tread chain being removed for the sake of clearness;

Fig. 3 is an enlarged detail of one of the two part sleeves used in connecting the rear of the creeper truck side frame members to the tractor body;

Fig. 4 is a side elevation of the rear radius rod anchor plate taken on the line 7—7 of Fig. 2;

Fig. 5 is a transverse section through the truck frame at the rear of the side frame connecting axle, a portion of which is broken away to more clearly show the front radius rod;

Figs. 6 and 7 are enlarged sectional and end views respectively of the connecting axle fastenings to the truck side frame;

Fig. 8 is a diagrammatic view showing the flexible truck frame in somewhat distorted position.

Referring in more detail to the drawings, it is to be noted that the creeper tractor mechanism forming my invention is shown in full lines, while for the purposes of clearness, substantially all of the tractor structure has been omitted, only such parts being included in the drawing as are necessary to show the adaptation of the invention to the tractor structure. Such parts of the tractor as are shown in the drawings are indicated in dotted lines. It is to be understood that the invention is applicable to any of the well known tractor constructions, the present embodiment of the invention, however, is illustrated as particularly adapted for Fordson tractors.

The lower portion of the tractor body intermediate its ends is shown in Fig. 5 and indicated by reference character 15, while the front axle 16 pivoted to the forward end of the tractor body upon a pivot pin 17 extending through downwardly projecting lugs 18 on the body and also the rear axle 19 and its housing 21, are shown in Fig. 2. The body itself, however, may vary widely in its structural details and the construction thereof is immaterial since the present invention is concerned merely with the creeper tractor mechanism as such and which may be modified within wide limits to facilitate its attachment to any desired type of round wheel tractor body.

My improved creeper tractor mechanism, which is designed to replace the four wheels of a round wheel tractor, comprises, generally speaking, the rear creeper sprocket wheels 24, the front creeper sprocket wheels 25, the endless chain treads 26, and the creeper mechanism frame structure, the details of which will be more fully described and which includes the two side frames 27 connected together between their ends by the cross connecting axles 28 and 29.

The side frames 27 are made of sheet metal of suitable weight, and while each may be formed from a single sheet of metal bent into substantially a U-shape, it is preferable, for convenience in manufacture, to make these frames in two pieces which are connected together throughout their length by a series of rivets or bolts 31. The side walls of each side frame are preferably stiffened by beads or ribs 32 struck up from the body of the metal and the lower edges thereof are preferably flanged, as indicated at 33, which increases their strength and makes a broad lower edge. The connecting web or top of each frame extending between the side walls, is cut away at its forward end as indicated by 34 in Fig. 2 to accommodate the front creeper sprockets 25, and similarly this web is removed from the rear end to a point well forwardly of the drive creeper sprockets 24 to accommodate these sprockets in the openings 35, thus provided. The inner wall of each side frame extends full height at its rear extremity where it is reenforced with an angle iron 36 (Fig. 1) to which the rear brake band clip 37 is attached, while the outer wall is preferably inclined downwardly from the forward end of the opening 35 to the rear end of this wall so as to adequately clear the hub of the sprocket wheel 24, the upper edge of this wall being preferably flanged over, as indicated by 38 (Figs. 1 and 2).

Each side frame is therefore of channel-shape structure, formed of sheet metal, which, while of sufficient strength to preclude bending or buckling in a vertical plane under the loads imposed thereon, is still light enough to afford in each frame an inherent flexibility, particularly under torsional or twisting stresses and strains, which enables each side frame to accommodate itself within certain limits to irregularities in the terrene over which the tractor travels. The inherent flexibility in each frame is exemplified diagrammatically in Fig. 8, wherein each frame is shown as twisted or flexed to a considerable degree as it might be in actual practice as the result of terrene irregularities, and while this inherent flexibility enables the tractor to accommodate itself to irregularities over which it may be traveling, each side frame is inherently substantially rigid against bending movements in a vertical plane so that any liability of permanent bending or distortion of the frames or relative displacement of the parts carried thereby is obviated, being made of sheet metal the frames are considerably lighter and therefore more desirable than cast frame structures, and in addition are much stronger proportionately to their weight than cast frames, for the reason that each portion of a cast frame must be made sufficiently strong and heavy to resist without distortion the maximum stresses to which it may be subjected, whereas the flexible sheet metal frames contemplated by my invention are by reason of their inherent flexibility capable of distributing concentrated strains throughout a considerable portion of their area so as to oppose to the stresses an initially yielding and finally positive resistance which is not only greater but more desirable than a totally rigid side frame structure.

The feature of inherent flexibility is not confined exclusively to the side frames themselves, but is carried out in the entire frame structure of the creeper tractor mechanism and in its connection with the tractor body. With this end in view, the side frames are tied together by the cross axles 28 and 29 in such a way as to preclude relative approaching and separating movements of the side frames, but permitting relative vertical movements, as well as inherent torsional or twisting movements, of each frame.

The method of connection of the two cross axles 28 and 29 with the side frames is similar for both axles, and as illustrating the connection, reference should be had to Figs. 5 to 7 inclusive, from which it will be observed that each side wall of each side frame is perforated to loosely receive an annular head 39 formed on the axle, these heads at each end of each axle being spaced apart to correspond with the spacing of the side frame side walls. For the purpose of locking the side frames to the axles so as to permit a limited degree of flexibility and still maintain the proper relative relations between the axles and side frames, each head is provided just outside its side wall with a circumferential groove 41 and to the outer face of each side wall there is secured by bolts 42, a split ring comprising the two duplicate sections 43 and 44 having relatively opposed eyes through which the bolts pass to lock these ring sections securely to the side walls of the side frames with their inwardly extending flanges 45 engaged in their respective grooves 41. The axles are thereby securely, but flexibly, locked to the side frames, and while limited flexing movements of the side frames and limited movement of each side wall of the frame toward the other is permitted, the two side frames as a whole are securely, but flexibly, connected together, with the result that relative approaching and separating movements of the side frames are precluded, while relative vertical movements, as well as inherent twisting movements, of each frame are permitted.

Each side frame is equipped with a plurality of pairs of bearing rollers 46 preferably flanged as shown and disposed adjacent the outer faces of said side frames in position to travel upon the track chain 26 whereby the weight of the tractor is supported. These rollers are mounted on shafts extending transversely through the side frames and carried in bearings 47 which are flexibly attached to the side frames so as not to interfere with the flexing movements thereof. The details of the mountings for these rollers may, so far as the present invention is concerned, be of any preferred construction. The bearings may be lubricated through accessibly positioned grease cups 48, or other preferred means.

Each front creeper sprocket 25 is mounted upon a shaft 49 extending transversely of the side frame, the vertical walls of which are longitudinally slotted from their forward ends to accommodate the shaft and are strengthened at this point by U-shaped plates riveted or bolted to the side walls of the side frames and projecting forwardly thereof where they are connected by bolts 52 extending through spacing members 53 disposed between the forwardly projecting ends of each plate. The shafts 49 are adjustable longitudinally of the slots to impose the requisite tension upon the track chain 26 by means of adjusting screws 54, and the shafts are locked in adjusted position by tightening the nut 55 with which each shaft bolt is equipped.

The upper leg of each inner plate 51, i. e., the plate mounted upon the inner wall of the side frame, is extended forwardly, as indicated by reference character 56, to a position directly over an end of the front axle 16 to which it is pivotally and flexibly attached by a link connection 57, as shown in Fig. 1 so that this axle and thereby the forward end of the tractor body are carried directly by the forward ends of the side frames.

The rear ends of the side frames are connected to the rear axle housing 21 so as to oscillate about the rear axle, the connecting means being best illustrated in Figs. 1, 2 and 3. Referring to these figures, it will be observed that the axle housing 21 has securely clamped thereon a two-piece sleeve 58 rigidly clamped to the housing by bolts 59 passing through the opposed eyes 61 of the two-parts of the sleeve and, in order to ensure a tight fit and a strong clamping action of the sleeve upon the housing, a band 62 of suitable textile material is preferably interposed between the sleeve and the housing thereby ensuring a snug, non-slipping fit.

The assembled sleeve provides a circumferential groove 63 adapted to receive, and be loosely embraced by, a two-part collar, comprising the lower member 64 which is in the form of an elongated casting, indicated generally by 65, securely attached to the side frames by bolts or rivets 66, and a complementary upper portion 67 connected to the lower portion 64 by bolts 68 at opposite sides of the axle housing.

It will be observed, therefore, that the two-part sleeve 58 fixedly attached to the axle housing provides a bearing groove 63 adapted to accommodate the surrounding collar which is fixedly secured to the side frame and is adapted to oscillate about the sleeve as the forward ends of the side frames rise and fall relatively to the rear axle. These connections between the side frames and the rear axle housing therefore afford flexibility at this point which contributes to the general flexibility of the structure as a whole and facilitates its easy travel over uneven ground without imposing excessive strains and stresses upon the body of the tractor.

In addition to the connection of the tractor mechanism frame structure to the tractor body through the front and rear axles as has been explained, this frame structure is further flexibly connected to the tractor body intermediate its ends by radius rods, as will now be explained.

Operative connection is established between the front cross connecting axle 28 and the body of the tractor through a radius rod 69 pivotally attached to the axle 28 by a bolt 71 and pivotally connected at its other end to studs or ears 72 extending downwardly from the body of the tractor and adapted to receive a pin or bolt 73 which passes through an eye in the end of the radius rod. A flexible connection is thereby established between this cross connecting axle and the body which serves to retain the frame structure against lateral displacement with respect to the body, while at the same time permitting vertical undulatory movements thereof.

The casting 65 attached to one of the side frames 27 is also provided with spaced ears 74 to which one end of a radius rod 75 is pivotally connected by a pin 76 (Fig. 2), the other end of this rod being pivoted on a pin 77 between ears 78 projecting from a casting 79 adapted to be secured by the bolts employed to fasten a hand hole cover plate 81 to the body. This casting also comprises an inwardly extending hollow plug 82 adapted to project into a drain opening formed in the body of said tractor, serving to lend strength and rigidity to the connection and being made hollow and adapted to receive a smaller plug which may be removed for drainage purposes. It will be apparent that the pivotal connections at the ends of the radius rods 75 also permit of vertical movements of the side frame structure while retaining the same against lateral displacement relatively to the body.

It should be apparent from the foregoing that I have provided a creeper tractor mechanism which can be readily applied to a standard round wheel tractor, thereby converting such tractor into one of the creeper type. The creeper mechanism itself is inherently flexible, since not only does each side frame possess inherent flexibility, but these side frames are flexibly connected forming a flexible frame structure. This frame structure is flexibly connected to the tractor body, first, through the axles which afford a three-point suspension for the body, the front axle being pivotally connected to each side frame and the rear ends of the side frames being connected to the rear axle housing so as to oscillate in vertical planes about said housing. Furthermore, additional strength is added to the tractor as a whole by the flexible connections between the frame structure and the body which are established through the radius rods. The steering of the tractor is accomplished by manipulation of the customary steering wheel, the mounting of which on the body is not disturbed and the steering gear which supplants the front wheel steering gear is adapted to permit the steering of the tractor by braking one or the other of the rear creeper driving sprockets. Furthermore, provision is made for braking both of the driving sprockets whenever occasion requires.

It is believed that my invention and many of its inherent advantages will be understood and appreciated from the foregoing without further description, and while a preferred embodiment of the invention has been illustrated and described, it should be manifest that many modifications and variations of the structural details may be resorted to without departing from the essence of the invention as defined in the following claims.

I claim:

1. In a creeper tractor mechanism, the combination of a pair of flexible sheet metal side frames of substantially inverted U-shape provided with aligned openings through the side walls thereof, a cross connecting axle extending through the openings in each side frame and provided with circumferential grooves adjacent the side walls of each side frame, and means engaging in said groove and attached to said side walls whereby longitudinal displacement of said axle relatively to said side frames is precluded.

2. In a creeper tractor mechanism, the combination of a pair of inherently flexible sheet metal side frames provided with aligned openings, a cross connecting axle extending through said openings and provided with circumferential grooves adjacent the walls of said side frames, and a split ring engaged in each groove to prevent displacement of said axle from said side frames.

3. In a creeper tractor mechanism, the combination of a pair of inherently flexible U-shaped sheet metal side members, provided with a plurality of sets of alined openings, a cross-connecting axle extending through each set of said openings and so connected to said side members as to permit relative torsional flexure of the side walls of each of said U-shaped side members and to permit independent torsional flexure of said side members with respect to each other, while preventing relative transverse movement of said side members with respect to each other.

4. A creeper tractor mechanism adapted to be attached to a round wheel tractor body, comprising a pair of longitudinally extending vertically disposed U-shaped flexible metal members, each of said members carrying at its forward end an idler sprocket-wheel, driven sprocket-wheels carried by the rear axle of the tractor body, creeper chains trained about each pair of sprockets, load-carrying rollers arranged along the lower edge of said U-shaped metal members, means for supporting said rollers in the side walls of said U-shaped metal members, and means interconnecting said U-shaped side members, said roller supporting means and interconnecting means being arranged to permit relative flexure of the side walls of each of said U-shaped metal members and permitting relative flexure of said U-shaped members with respect to each other, means for securing said tractor body to said U-shaped members, said last mentioned means constructed to permit vertical oscillation of said U-shaped members and additional means for preventing lateral displacement of said tractor body with respect to said U-shaped members.

5. A creeper tractor mechanism adapted to be attached to a round wheel tractor body to replace the round wheels thereof, comprising a frame structure, including a pair of longitudinally extending side members, transversely extending members interposed intermediate the length of said side members, means for connecting said transverse members and side members, said last mentioned means permitting independent torsional flexure of said side members, while preventing lateral movement thereof, means for pivotally supporting the rear end of each of said side members upon the rear axle housing of said tractor body, said pivotal supporting means including complementary clamping members adapted to be attached to and project beyond the ends of said rear axle housing, to support said side members beyond the ends of said rear axle housing.

6. A creeper tractor mechanism adapted to be attached to a round wheel tractor body to replace the round wheels thereof, comprising a frame structure, including a pair of longitudinally extending side members, transversely extending members, means for connecting said transverse members and side members, said last mentioned means permitting independent torsional flexure of said side members, while preventing lateral movement thereof, means for pivotally supporting the rear end of each of said side members upon the rear axle housing of said tractor body beyond the ends of said rear axle housing, and means for flexibly connecting the forward end of each of said side members to the associated end of the front axle of said tractor body, to permit independent vertical oscillation and torsional flexure of said side members.

7. A creeper tractor mechanism adapted to be attached to a round wheel tractor body to replace the round wheels thereof, comprising a frame structure including a pair of longitudinally extending side members, transversely extending members interposed intermediate the length of said side members, means for pivotally supporting the rear end of each of said side members upon the rear axle housing of said tractor body, said pivotal supporting means including clamping members adapted to be attached to and project beyond the ends of said rear axle housing to support said side members beyond the ends of said rear axle housing.

8. A creeper tractor mechanism adapted to be attached to a round wheel tractor body to replace the round wheels thereof, comprising a frame structure, including a pair of longitudinally extending side members, transversely extending members associated with said longitudinally extending side members, means for pivotally supporting the rear end of each of said side members upon the rear axle housing of said tractor body beyond the ends of said rear axle housing to permit vertical oscillation of said side members with respect to said rear axle housing.

GEORGE C. JETT.